United States Patent
McKenney et al.

(10) Patent No.: US 10,311,039 B2
(45) Date of Patent: Jun. 4, 2019

(54) OPTIMIZED ITERATORS FOR RCU-PROTECTED SKIPLISTS

(71) Applicant: International Business Machines Corporation, Armonk, NY (US)

(72) Inventors: Paul E. McKenney, Beaverton, OR (US); Manuel Mayr, Walldorf (DE)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/372,197

(22) Filed: Dec. 7, 2016

(65) Prior Publication Data

US 2018/0157696 A1 Jun. 7, 2018

(51) Int. Cl.
*G06F 16/00* (2019.01)
*G06F 16/23* (2019.01)

(52) U.S. Cl.
CPC ...... *G06F 16/2343* (2019.01); *G06F 16/2365* (2019.01)

(58) Field of Classification Search
CPC ......... G06F 17/30362; G06F 17/30371; G06F 17/30171; G06F 17/30339; G06F 17/30377; G06F 17/30864; G06F 17/30359; G06F 17/30595; G06F 16/2343; G06F 16/2365
USPC ...................................................... 707/704
See application file for complete search history.

(56) References Cited

U.S. PATENT DOCUMENTS

| | | | |
|---|---|---|---|
| 5,924,098 A | 7/1999 | Kluge | |
| 6,581,063 B1 | 6/2003 | Kirkman | |
| 7,814,082 B2 * | 10/2010 | McKenney | ....... G06F 17/30359 707/704 |
| 8,615,771 B2 * | 12/2013 | McKenney | ............. G06F 9/526 707/704 |
| 2006/0130061 A1 * | 6/2006 | Bauer | ..................... G06F 9/526 718/100 |
| 2012/0324473 A1 * | 12/2012 | McKenney | ............. G06F 9/526 718/107 |

OTHER PUBLICATIONS

Anonymous, "Use of transactional memory for linked lists without locks", IP.com No. IPCOM000245536D, available at: http://ip.com/IPCOM/0002455360, Mar. 15, 2016 (Year: 2016).*

(Continued)

*Primary Examiner* — Evan Aspinwall
(74) *Attorney, Agent, or Firm* — Walter W. Duft

(57) ABSTRACT

An optimized skiplist iterator technique for RCU-protected skiplists. A skiplist iterator operation may attempt to validate a cached pointer hint that references a skiplist element of an RCU-protected skiplist, the skiplist element having an associated first key. If the pointer hint is validated, the pointer hint may be dereferenced to access the skiplist element. A pointer in the skiplist element may be dereferenced to advance to a next skiplist element of the RCU-protected skiplist, the next skiplist element having an associated second key that is larger than the first key. If the pointer hint is not validated, a value-based skiplist iterator operation may be performed that includes traversing the RCU-protected skiplist using the first key to find the next skiplist element having the second key. A new pointer hint that references the next skiplist element may be cached for use in a next invocation of the skiplist iterator operation.

20 Claims, 4 Drawing Sheets

(56) References Cited

OTHER PUBLICATIONS

Anonymous, "Use of transactional memory for linked lists without locks"; http://ip.com/IPCOM/000245536D, Mar. 15, 2016, 6 pages.
Anonymous, "Methodology and apparatus for real-time data validation for an online database"; http://ip.com/IPCOM/000200601D, Oct. 20, 2010, 5 pages.

* cited by examiner

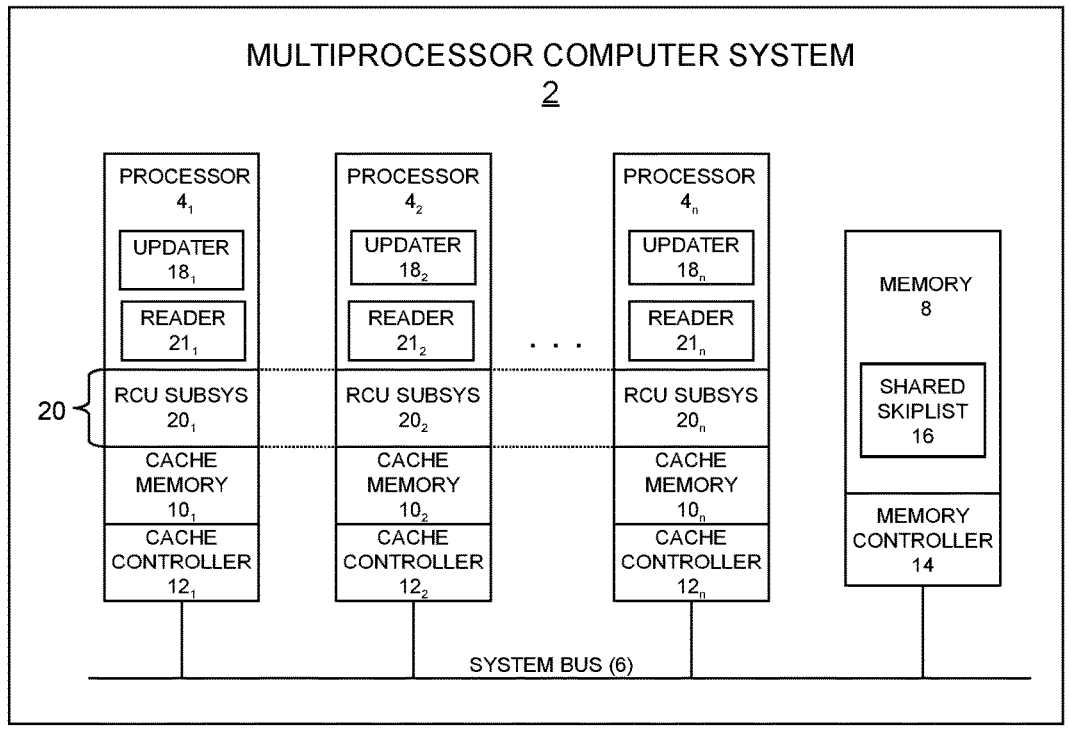
FIG. 1
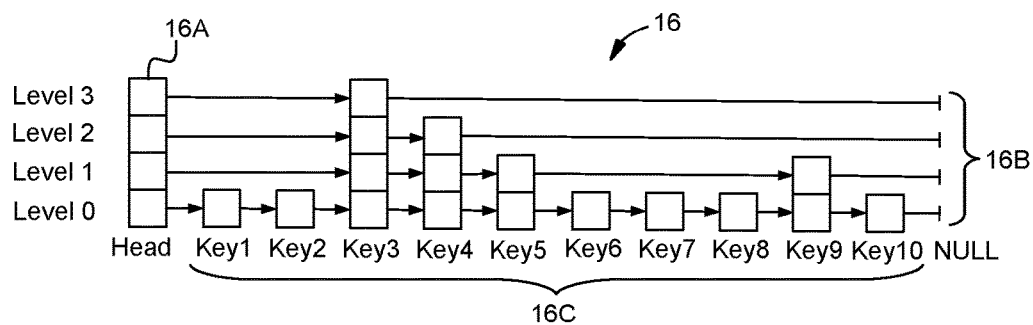
FIG. 2
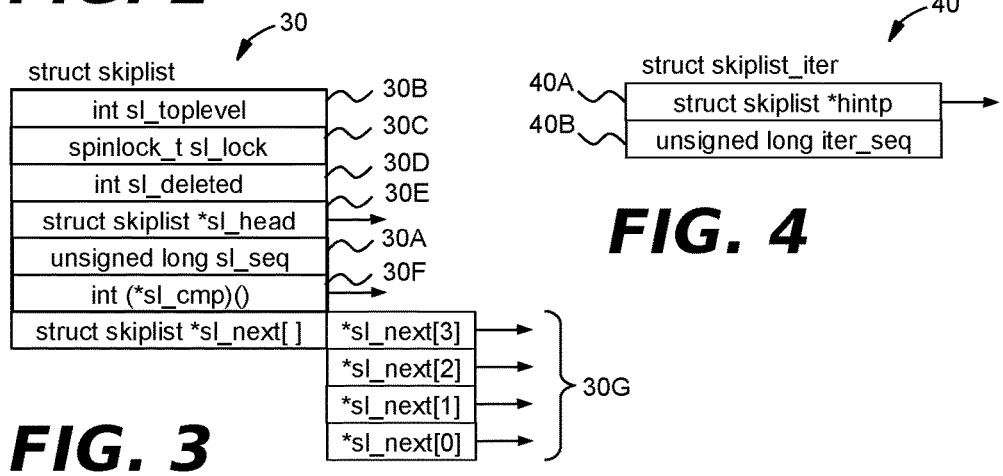
FIG. 3
FIG. 4

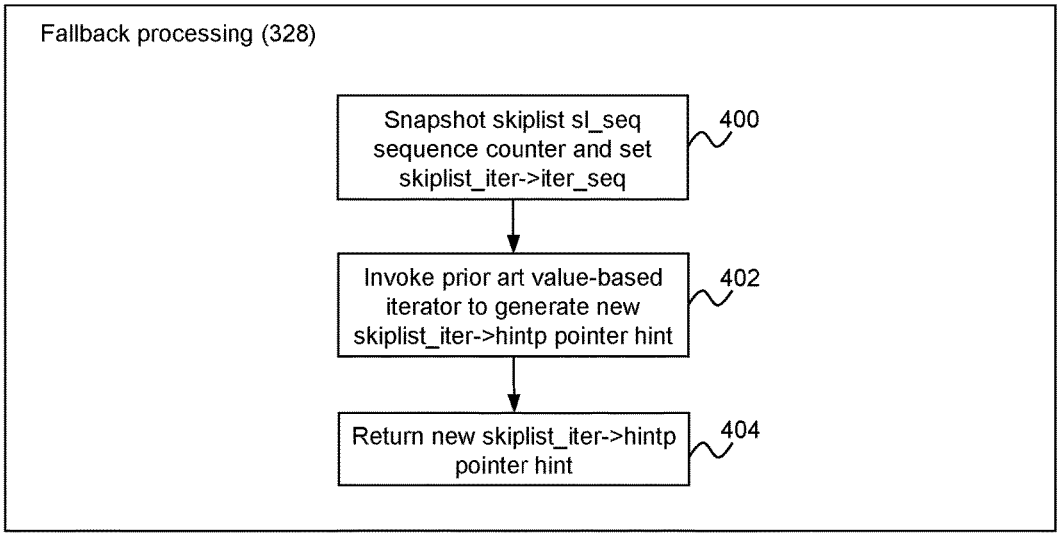

FIG. 8

```
Value-based iterator (402)

1    struct skiplist *
2    skiplist_valiter_next(struct skiplist *head_slp, void *key)
3    {
4      int level;
5      struct skiplist *slp = head_slp;
6      struct skiplist *next_slp;
7
8      for (level = slp->sl_toplevel; level >= 0; level--) {
9        next_slp = rcu_dereference(slp->sl_next[level]);
10       while (next_slp && head_slp->sl_cmp(next_slp, key) <= 0) {
11         slp = next_slp;
12         next_slp = rcu_dereference(slp->sl_next[level]);
13       }
14     }
15     next_slp = rcu_dereference(slp->sl_next[0]);
16     while (next_slp && head_slp->sl_cmp(next_slp, key) <= 0) {
17       slp = next_slp;
18       next_slp = rcu_dereference(slp->sl_next[0]);
19     }
20     return next_slp;
21   }
```

FIG. 9 (Prior Art)

OPTIMIZED ITERATORS FOR RCU-PROTECTED SKIPLISTS

BACKGROUND

1. Field

The present disclosure relates to data searching techniques and data structures that facilitate searching. More particularly, the disclosure concerns the use of skiplists that facilitate searches of data subject to concurrent read and write access. Still more particularly, the disclosure is directed to iterator mechanisms for read-copy update (RCU)-protected skiplists.

2. Description of the Prior Art

By way of background, concurrent skiplists protected by concurrency control mechanisms resembling RCU have been described. However, efficient skiplist iterators are less well known. A skiplist iterator reader differs from a non-iterator skiplist reader in that the iterator reader reads a sequence of skiplist elements as it iterates through the skiplist. A non-iterator reader looks up a single skiplist value. If the non-iterator reader looks up another value, there will not necessarily be any relationship between the values looked up. There are several known skiplist iterator approaches, but they have corresponding drawbacks.

One known iterator approach is to enclose the entire skiplist iteration within an RCU read-side critical section. This works, but will unduly delay grace periods when used to traverse a large skiplist. Modern memory sizes support skiplists with billions of entries, so the delays can be quite large.

Another known iterator approach is to use a value-based skiplist iterator, so that an iterator advances past the most recent skiplist element visited by the iterator by looking up the skiplist element with the next highest key. This allows the RCU read-side critical sections to be restricted to the individual iterator operations, thus avoiding undue grace-period delays, but can incur large numbers of cache misses on each iterator operation.

Another known iterator approach is to use reference counters to ensure that the most recent skiplist element visited by the iterator remains in place for the next invocation of the iterator. This works, but inflicts expensive cache misses on the iterators and perhaps also on non-iterator readers. It also can result in memory leaks should iterator traversal be abandoned midway through the iteration.

There is thus motivation to produce an improved skiplist iterator technique for RCU-protected skiplists.

SUMMARY

A method, system and computer program product are provided for implementing an optimized skiplist iterator technique for read-copy update (RCU)-protected skiplists. In accordance with the disclosed technique, a skiplist iterator operation may be performed that includes attempting to validate a cached pointer hint that references a skiplist element of an RCU-protected skiplist, the skiplist element having an associated first key. If the pointer hint is validated, the pointer hint may be dereferenced to access the skiplist element. A pointer in the skiplist element may be dereferenced to advance to a next skiplist element of the RCU-protected skiplist, the next skiplist element having an associated second key that is larger than the first key. If the pointer hint is not validated, a value-based iterator skiplist operation may be performed that includes traversing the RCU-protected skiplist using the first key to find the next skiplist element having the second key. A new pointer hint that references the next skiplist element may be cached for use in a next invocation of the skiplist iterator operation.

BRIEF DESCRIPTION OF THE DRAWINGS

The foregoing and other features and advantages will be apparent from the following more particular description of example embodiments, as illustrated in the accompanying Drawings.

FIG. 1 is a functional block diagram showing a multiprocessor computing system.

FIG. 2 is a diagrammatic representation of an example skiplist.

FIG. 3 is a functional block diagram showing an example skiplist element structure.

FIG. 4 is a block diagram showing an example skiplist iterator.

FIG. 8 is a flow diagram showing an example iterator regeneration operation.

FIG. 9 is a flow diagram showing a prior art value-based skiplist iterator operation.

DETAILED DESCRIPTION OF EXAMPLE EMBODIMENTS

Figure 5:
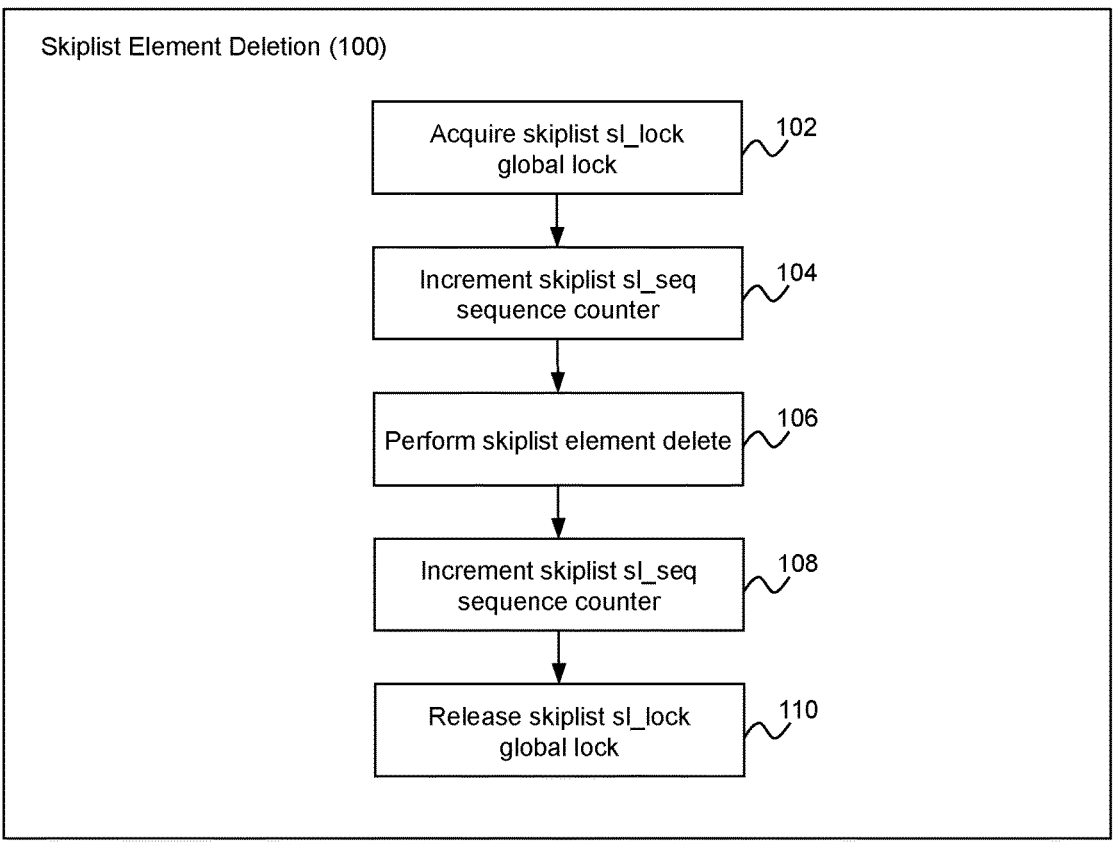
FIG. 5 is a flow diagram showing an example skiplist deletion operation.

Turning now to the Figures, wherein like reference numerals represent like elements in all of the several views, FIG. 1 illustrates an example multiprocessor computer system 2 in which an optimized iterator technique for RCU-protected skiplists may be implemented. In FIG. 1, the computer system 2 may include a plurality of processors $4_1$, $4_2 \ldots 4_n$, a system bus 6, and a program memory 8. There may also be cache memories $10_1$, $10_2 \ldots 10_n$ and cache controllers $12_1$, $12_2 \ldots 12_n$ respectively associated with the processors $4_1$, $4_2 \ldots 4_n$. A memory controller 14 may be associated with the memory 8. As shown, the memory controller 14 may reside separately from the processors $4_2 \ldots 4_n$ (e.g., as part of a chipset). Alternatively, the memory controller 14 could include plural memory controller instances that are respectively integrated with the processors $4_1$, $4_2 \ldots 4_n$. Some or all of a shared skiplist 16 may be stored in the memory 8 (or elsewhere) for use during system operations.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1$, $4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run from program instructions stored in the memory 8 (or elsewhere) in order to periodically perform updates on the shared skiplist 16 stored in the shared memory 8 (or elsewhere). In FIG. 1, reference numerals $18_1, 18_2 \ldots 18_n$ illustrate individual data updaters that respectively execute on the several processors $4_1, 4_2 \ldots 4_n$. The updates performed by an RCU updater can include modifying elements of the skiplist 16, inserting new elements into the skiplist, and deleting elements from the skiplist. To facilitate such updates, the processors 4 may be programmed from instructions stored in the memory 8 (or elsewhere) to implement a read-copy update (RCU) subsystem 20 as part of their processor functions. In FIG. 1, reference numbers $20_1, 20_2 \ldots 20_n$ represent individual RCU instances that may respectively periodically execute on the several processors $4_1, 4_2 \ldots 4_n$.

The processors 4 may also periodically execute read operations (readers) 21. Each reader 21 runs from program instructions stored in the memory 8 (or elsewhere) in order to periodically access elements of the skiplist 16 stored in the shared memory 8 (or elsewhere). In FIG. 1, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update.

It is possible for a reader 21 to simultaneously reference one of the elements of the skiplist 16 while an updater 18 updates the same skiplist element, at least so long as the reader's skiplist iterations are performed within a single RCU read-side critical section. If the reader's skiplist iterations span several RCU read-side critical sections, the reader 21 must expect that an updater 18 may have made skiplist modifications during times when the reader is outside the RCU read-side critical sections. In this scenario, the reader 21 cannot assume that a pointer to the last visited skiplist element remains valid.

As noted by way of background above, known techniques for performing skiplist iterations that span more than one RCU reads-side critical section include value-based iterators and reference count-based iterators. A value-based skiplist iterator traverses the skiplist until it finds the skiplist element with the next highest key relative to the skiplist element that was most recently visited by the skiplist iterator. This can incur large numbers of cache misses on each iterator operation due to the potentially large number of skiplist elements that may be visited during each traversal. The reference-count skiplist iterator technique uses reference counters to ensure that the most recent skiplist element encountered by the skiplist iterator remains in place for the next invocation of the skiplist iterator. This also inflicts expensive cache misses on the iterators and perhaps additionally on non-iterator readers due to cache invalidations corresponding to the writes used to manipulate the reference counts. It also can result in memory leaks should iterator traversal be abandoned midway through the iteration.

An optimized iterator technique for RCU-protected skiplists that overcomes the foregoing disadvantages will now be described. The disclosed technique is designed for an RCU-protected skiplist in which updates are protected by a single global lock, as appropriate for skiplists in which read operations dominate updates. For purposes of discussion only, FIG. 2 depicts one possible example of an RCU-protected skiplist 16 for which the present iterator technique may be used. The skiplist 16 has four levels respectively identified as "level 0," "level 1," "level 2," and "level 3," with level 0 being the lowest level and level 3 being the topmost level. There is a skiplist header 16A, a set of skiplist NULL pointers 16B (indicating the end of the skiplist 16), and a plurality of skiplist data elements 16C that each have an associated key value representing the skiplist element's data. The skiplist header 16 A and the skiplist data element 16C for "key3" maintain pointers to other skiplist elements at all levels 0-3 of the skiplist 16. The skiplist data element 16C for "key4" maintains pointers at levels 0-2 of the skiplist 16. The skiplist data elements 16C for "key5" and "key9" maintain pointers a levels 0-1 of the skiplist 16. The remaining skiplist data elements 16C maintain pointers at level 0 of the skiplist 16.

In accordance with the optimized iterator technique disclosed herein, the skiplist header 16A may utilize the example "skiplist" element structure 30 shown in FIG. 3. The skiplist element structure 30 differs from existing skiplist header structures in that it maintains an intervening deletion indicator that indicates whether an intervening skiplist element deletion operation occurred since the last optimized skiplist iteration. By way of example only, the intervening deletion indicator may be implemented as a sequence counter 30A that an updater 18 may increment at the beginning and end of each skiplist update operation involving the deletion of a skiplist data element 16C. In the illustrated embodiment, the sequence counter 30A is implemented as an unsigned long integer named named "sl_seq". Other data types could also be used. The sl_seq sequence counter 30A may have an odd value if a deletion is in progress, and may have even value otherwise. From the viewpoint of a concurrent reader 21, an odd sequence counter value indicates that one or more skiplist data elements 16C are being removed from the skiplist 16, so that old cached skiplist element pointer values might no longer be valid. In an alternate embodiment, the deletion indicator could be stored outside of the skiplist header's skiplist structure 30.

It should be noted that each of the skiplist data elements 16C may also have an associated skiplist element structure 30. However, the sl_seq sequence counter field 30A is not needed by the skiplist data elements 16C, and is not used to store sequence counter values. In an embodiment, the skiplist data elements 16C could have their own skiplist element structures that do not have a sequence counter field.

The remaining fields of each skiplist element structure 30, whether used by the skiplist header 16A or the skiplist data elements 16C, are conventional. These fields may include an integer field 30B named "sl_toplevel" that indicates the highest level at which the skiplist element structure 30 maintains pointers to other skiplist elements 16C. A spinlock_t field 30C named "sl_lock" may be used by an updater 18 to lock the associated skiplist element with respect to other updaters. An integer field 30D named "sl_deleted" is a flag that may be used as a concurrent deletion indicator that an updater 18 may set to indicate that the associated skiplist element in the process of being deleted (and will later be reclaimed at the end of an RCU grace period). A skiplist structure pointer field 30E named "*sl_head" may be used to reference the skiplist header 16A. A function pointer field 30F "(*sl_comp)( )" may be used to reference a function that compares a skiplist element's key with a target search key. A array field 30G named "*sl_next[ ]" may be used to store next-element pointers at the various levels of the skiplist 16. For the skiplist 16, the array field 30G is a four-element array containing next-element pointers for levels 0-3 of the skiplist. Each array index value indicates the level at which the associated skiplist element maintains a pointer to the next skiplist element at that level. If a skiplist element does not maintain a pointer at a particular level, the corresponding element of the array 30G is not utilized. As previously noted the NULL pointers 16B may be used to indicate that the end of the skiplist 16 has been reached.

FIG. 4 illustrates an example iterator structure 40 named "skiplist_iter." The skiplist_iter iterator structure 40 has two fields, 40A and 40B. The field 40A is a skiplist structure pointer hint field named "*hintp" that may be used to cache a pointer (skiplist_iter->hintp) to the skiplist data element 16C most recently visited by a skiplist iterator operation. The pointer stored in the *hintp pointer hint field 40A is referred to as a pointer hint because the skiplist data element 16C referenced by the pointer is subject to being deleted at any time by an updater 18, and therefore may not be valid when dereferenced during a subsequent iterator operation (see discussion of FIG. 7 below). The field 40B is an unsigned long integer field named "iter_seq" (skiplist_iter->iter_seq) that may be used to store a snapshot of the skiplist header's sl_seq sequence counter 30A. The iter_seq sequence counter snapshot 40B can be used to determine whether or not the *hintp pointer hint 40A remains valid.

An optimized iterator initialization operation (see discussion of FIG. 6 below) may be performed to initialize the skiplist_iter iterator structure 40 prior engaging in optimized iterator operations as contemplated herein (see discussion of FIG. 7 below). The skiplist_iter iterator structure 40 may be initialized by taking a snapshot of the skiplist header's sl_seq sequence counter 30A and storing it in the iterator structure's iter_seq sequence counter snapshot field 40B. The snapshot operation may include clearing the bottom bit of the sl_seq sequence counter 30A to reject *hintp pointer hints captured during a deletion. The skiplist_iter iterator structure 40 may be further initialized by caching a pointer to a first skiplist element, as by storing it in the *hintp pointer hint field 40A. For reasons that will become apparent from the ensuing discussion, the key associated with the first skiplist element may also be cached. In an embodiment, the skiplist_iter iterator data structure 40 may be used to store the key. However, the size of the key may vary, such that it may be more efficient to store the key independently of the skiplist_iter iterator structure 40 (who's fields may be of fixed size).

An optimized iterator operation may attempt to validate the *hintp pointer hint 40A. In an embodiment, the validation attempt may be performed for all invocations of the optimized iterator operation. Alternatively, the validation attempt could be limited to the first invocation of the optimized iterator operation for each new RCU read-side critical section. If the iterator structure's iter_seq sequence counter snapshot field 40B indicates that the skiplist header's sl_seq sequence counter 30A is valid and has not changed, the *hintp pointer hint 40A is valid and next invocation of the optimized iterator operation can simply advance to the next skiplist element. On the other hand, if the skiplist header's sl_seq sequence counter 30A has changed or has an invalid value, the iterator structure's *hintp pointer hint 40B might no longer be valid. In that case, a fallback approach is taken using a conventional value-based skiplist iterator operation. The value-based iterator operation traverses the skiplist 16, to locate the first element whose key is larger than the one that was cached by the previous invocation of the optimized iterator operation. In conjunction with invoking the value-based iterator operation, the skiplist_iter structure 40 may be regenerated by storing a new snapshot of the skiplist header's sl_seq sequence counter 40B, together with the pointer to the skiplist element found by the value-based iterator operation. This pointer will serve as the *hintp pointer hint 40A for the next invocation of the optimized iterator operation.

The foregoing optimized iterator technique allows skiplist iterator operations to run at nearly full speed if there are no deletions in progress, but still operate correctly in the presence of concurrent deletions. The value-based iterator fallback operation will be slower, but resort to this approach should be a relatively infrequent insofar as read-side operations involving RCU-protected skiplists typically will substantially outnumber skiplist deletion operations.

Turning now to FIG. 5, an example skiplist deletion operation 100 is shown. The deletion operation 100 may be used by an updater 18 to coordinate with readers 21 that employ the optimized iterator technique disclosed herein. In block 102, the updater 18 acquires the skiplist header's sl_lock 30C. In block 104, the updater 18 increments the skiplist header's sl_seq sequence counter 30A. Block 106 performs the actual skiplist element deletion. In block 108, the updater 18 again increments the skiplist header's sl_seq sequence counter 30A. The updater 18 then releases the skiplist header's sl_lock 30C in block 110.

Figure 6:
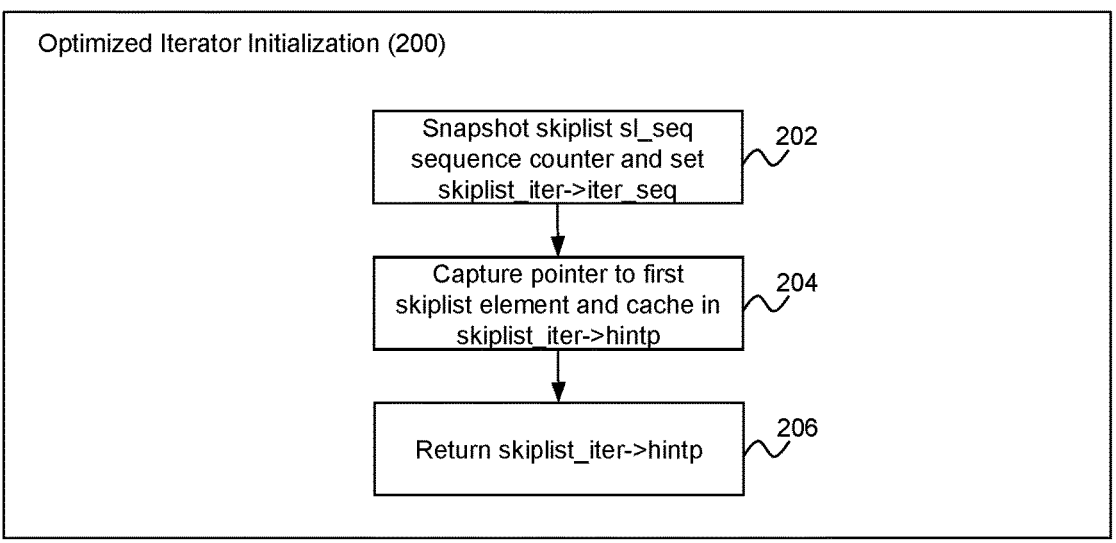
FIG. 6 is a flow diagram showing an example optimized skiplist iterator initialization operation.
Figure 7:
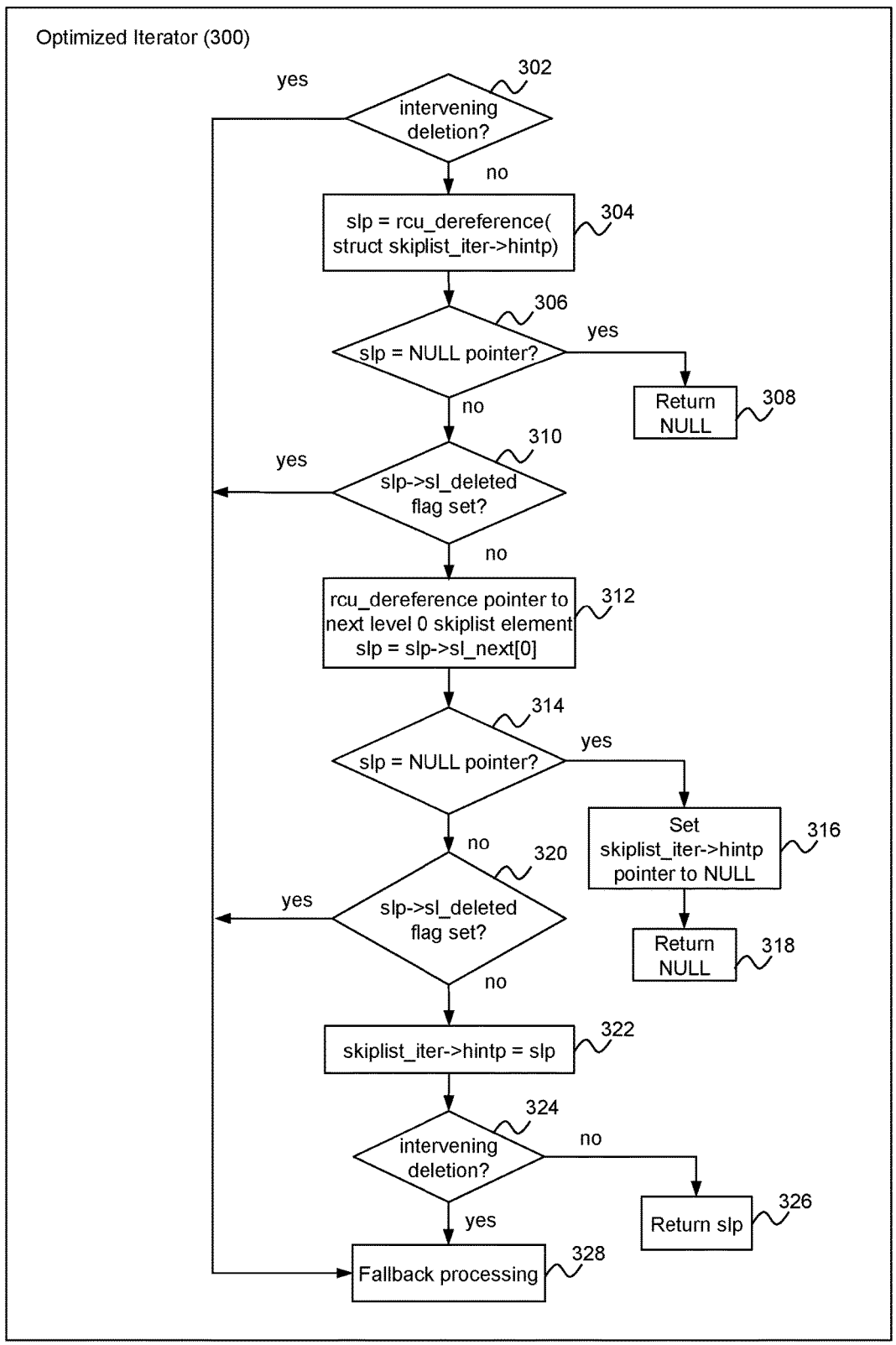
FIG. 7 is a flow diagram showing an example optimized skiplist iterator operation.

Turning now to FIGS. 6 and 7, an optimized skiplist iterator technique according to an example embodiment of the present disclosure is shown. FIG. 6 illustrates an example embodiment of an optimized skiplist iterator initialization operation 200. FIG. 7 illustrates an example embodiment of an optimized skiplist iterator operation 300. A reader 21 may invoke the iterator initialization operation 200 to access the first skiplist data element 16C and initialize the skiplist_iter iterator structure 40, and then repeatedly invoke the iterator operation 300 to advance through additional data elements of the skiplist 16. It is assumed that both operations may be called by a reader 21 from within an RCU read-side critical section, and the reader may remain within that critical section while using pointers that are respectively returned from these operations (as discussed below). If a reader 21 intends to exit its RCU read-side critical section after an iterator operation 300 completes and prior to a further call to the iterator operation, the reader may make a copy of the key associated with the current skiplist element 16C prior to exit.

Turning now to FIG. 6, block 202 of the example iterator initialization operation 200 snapshots the skiplist header's sl_seq sequence counter 30A and stores the counter value in the iter_seq sequence counter snapshot field 40B (skiplist->iter_seq). In block 204, the skiplist header's *sl_next array 30G is consulted to capture the level[0] pointer to the first skiplist data element 16C. In the skiplist 16 of FIG. 2, this is the "key1" skiplist data element 16C. Block 204 caches the captured pointer in the skiplist iterator structure's *hintp field 40A. Block 206 returns the *hintp pointer hint 40A to the caller (i.e., the reader 21 that called the optimized iterator initialization operation 200).

Turning now to FIG. 7, blocks 302-310 of the example optimized skiplist iterator operation 300 validate the pointer hint cached in the *hintp pointer hint field 40A (skiplist_iter->hintp). If the *hintp pointer hint 40 is invalid, control jumps to block 328. As described below in connection with FIG. 8, block 328 invokes fallback processing in which a value-based skiplist iterator operation is performed. The fallback processing of block 328 also regenerates the iter_seq sequence counter snapshot 40B and the *hintp pointer hint 40A of the skiplist_iter iterator structure 40. Block 302 checks for an intervening deletion by comparing the iter_seq sequence counter snapshot 40B against the current value of the skiplist header's sl_seq sequence counter 30A. A difference in values indicates an intervening deletion and causes control to jump to block 328 for fallback processing. Otherwise, if there is no intervening deletion, block 304 invokes the RCU rcu_dereference( ) primitive to dereference the *hintp pointer hint 40A. For the first invocation of the optimized iterator operation 300, the *hintp pointer hint 40A will be the first skiplist data element 16C returned by the optimized iterator initialization operation 200. For subsequent invocations of the optimized iterator operation 300, the *hintp pointer hint 40A will be the skiplist data element 16C visited in the last invocation of the optimized iterator operation. In an embodiment, block 304 may assign the *hintp pointer hint 40A a skiplist structure pointer name, such as struct skiplist *slp. In that case, block 304 may be of the form "slp=rcu_dereference(struct skiplist_iter->hintp)," as shown in FIG. 7.

Block 306 checks the *slp pointer from block 304 for a NULL hint, and if true, block 308 returns NULL to the caller (i.e., the reader 21 that called the optimized iterator operation 300). The NULL hint can occur if the caller insists on invoking the optimized iterator operation 300 despite the prior call having returned NULL. If block 306 determines that the *slp pointer from block 304 is not NULL, control advances to block 310, which checks the slp->sl_deleted field 30D for a concurrent deletion. If true, control jumps to block 328 for fallback processing. If block 310 determines that the *slp pointer is still valid, control reaches block 312, which advances to the next skiplist data element 16C at level 0 of the skiplist 16. In the illustrated embodiment, the *slp pointer is updated to reference to the next skiplist data element (e.g., using an assignment such as slp=slp->sl_next[0], where the slp->sl_next[0] pointer is stored at index [0] of the current slp element's sl_next array 30G).

Block 314 checks whether there is no next skiplist data element 16C (i.e., whether slp=NULL). If true, block 316 updates the skiplist_iter iterator structure 40 by setting the *hintp pointer hint 40A to NULL and block 318 returns NULL to the caller (i.e., the reader 21 that called the optimized iterator operation 300). If block 314 determines that there is a next skiplist data element 16C (i.e., slp≠NULL), block 320 checks the next skiplist data element's sl_deleted flag 30D (slp->sl_deleted) for a concurrent deletion. If true, control jumps to block 328 for fallback processing. If block 320 determines that the next skiplist data element 16C is not undergoing concurrent deletion, block 322 updates the skiplist_iter iterator structure 40 to records a new *hintp pointer hint 40A for the new skiplist data element (e.g., using an assignment such as skiplist_iter->hintp=slp). Block 324 then checks whether there remains no intervening deletion by comparing the iter_seq sequence counter snapshot 40B against the current value of the skiplist header's sl_seq sequence counter 30B. If true, block 326 returns a pointer to the current skiplist data element 16C (i.e., the current value of slp). Otherwise, execution reaches block 328 and fallback processing is performed.

Turning now to FIG. 8, an example embodiment of the fallback processing operation 328 is shown. Block 400 takes a new snapshot of the sl_seq sequence counter 30A in the skiplist header's skiplist data structure 30, and stores the counter value in the iter_seq sequence counter snapshot field 40B of the skiplist_iter iterator structure 40. Block 402 invokes a prior art value-based iterator operation to generate a new *hintp pointer hint and store it in the *hintp pointer hint field 40A of the skiplist_iter iterator structure 40. Block 404 returns the new *hintp pointer hint to the caller (i.e., the reader 21 that called the optimized iterator operation 300).

Turning now to FIG. 9, an example embodiment of the prior art value-based skiplist iterator operation invoked in block 402 of FIG. 8 is shown. In order to faithfully represent the prior art, FIG. 8 depicts the value-based iteration operation as a C-language function. Lines 1-2 define a function named skiplist_valiter_next ( ). This function has a return type of struct skiplist *, and takes two parameters. The first parameter named struct skiplist *head_slp is a pointer to the skiplist structure 30 of the skiplist header 16A. The second parameter named void *key is a pointer to the key of a skiplist data element 16C that was most recently visited by the last invocation of the optimized iterator operation 300. As previously noted, the last invocation of the optimized iteration operation that cached the key is assumed to have been invoked within a RCU read-side critical section that immediately preceded the current RCU read-side critical section. Prior to a reader 21 exiting that critical section, the reader will have obtained the key from the skiplist data element 16C whose *slp pointer was returned in block 326 of FIG. 7, and will have cached the key by storing it in a suitable data storage location.

The skiplist_valiter_next( ) function attempts to find the first skiplist data element 16C whose key is larger than the cached key whose pointer is passed as the *key parameter to the skiplist_valiter_next( ) function. The skiplist_valiter_next( ) function performs its search by traversing the full skiplist 16, starting from the skiplist header 16A at its highest level (level[3] in FIG. 2) until the desired skiplist data element 16C associated is found at level[0]. A pointer to this data element 16C will be used as a new *hintp pointer hint 40A for the next optimized skiplist iterator operation 300.

Starting from the skiplist header 16A (*slp=head_slp) at the highest level of the skiplist (slp->sl_toplevel), the loop spanning lines 8-14 of the skiplist_valiter_next( ) function locates the skiplist data element 16C having the cached key, or if no such element exists, the element with the largest key that is less than the previous key, or if no such element exists, a pointer to the skiplist header 16C. Line 15 of the skiplist_valiter_next( ) function advances to the next skiplist data element 16C, which normally will be the element having the smallest key greater than the cached key. However, a concurrent sequence of deletions and insertions could invalidate this assumption, so the loop spanning lines 16-19 advances to the required key, or results in a NULL pointer if there is no such element. Finally, line 20 returns the desired pointer for use as the new *hintp pointer hint 40A.

Summarizing FIGS. 6-9, in the common case where there is no deletion during an iterator traversal performed by successive calls to the optimized iterator operation 300, the operation 300 will use a single pointer dereference (block 312 of FIG. 7) to reach the next skiplist data element 16C. This optimization can greatly reduce iterator overhead, for example, by reducing the number of cache misses when traversing large skiplists using prior art skiplist iterator techniques. Should the *hintp pointer hint 40A be invalidated, the reader 21 may have to fall back on the comparatively slower value-based iterator operation 402. However, this should be relatively rare given that the ratio of RCU update operations to RCU read operations is low. Moreover, if the *hintp pointer hint validation operations of blocks 302-320 are only performed for the first optimized iterator operation 300 of a new RCU read-side critical section, the likelihood that a *hintp pointer hint validation attempt will fail falls even further.

Skiplist implementations normally do not implement rebalance operations, as the normal skiplist insertions result with high probability in a random tree with reasonable lookup path length. Nevertheless, rebalancing can sometimes be beneficial, and rebalancing skiplists do exist. Accordingly, skiplist rebalancing may be performed in an embodiment of the present disclosure. These rebalance operations may copy skiplist data elements 16C and delete the old versions. Such rebalance operations may also update the sl_seq sequence counter 30A of the skiplist header's skiplist structure 30. In this way, the optimized skiplist iterator operation 300 may accommodate skiplist rebalancing in addition to skiplist deletions.

It should be further noted that the value of the sl_seq sequence counter 30A of the skiplist header's skiplist structure 30 will always be double the number of deletions insofar as this counter incremented at the both the beginning and end of a skiplist element deletion operation (see FIG. 5). This means that sl_seq sequence counter 30A can be used in an embodiment as both a sequence counter and a count of the number of deletions. It is also not uncommon for skiplists to only increase in size, with the only deletions being those associated with rebalance operations. In such cases, the *hintp pointer hints 40A would only be invalidated by rebalance operations and the sl_seq sequence counter 30A could then serve as a count of the number of rebalance operations.

It is sometimes desirable to implement reverse skiplist iterators that search skiplist data elements in a reverse direction. If there are no backwards pointers in a given skiplist, as is the case with the singly-linked skiplist 16 shown in FIG. 2, reverse iterators must use value lookups in a manner similar to the value-base iterator operation 402 of FIG. 9. However, doubly linked skiplists do have backwards pointers, in which case an optimized reverse iterator operation may be implemented in a manner similar to that used by the optimized skiplist iterator operation 300 of FIG. 7.

Accordingly, an optimized skiplist iterator technique for RCU-protected skiplists has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 1-9.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 1. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the present disclosure. It is understood, therefore, that an invention as disclosed herein is not to be in any way limited except in accordance with the spirit of the appended claims and their equivalents.

What is claimed is:

1. An optimized skiplist iterator method for read-copy update (RCU)-protected skiplists, comprising:
   entering an RCU read-side critical section;
   accessing an RCU-protected skiplist having more than one level of pointers between skiplist elements, including a lowest level in which all of the skiplist elements are linked in succession in search key order, and one or more higher levels in which some of the skiplist elements are skipped;
   performing a skiplist iterator operation that includes attempting to validate a cached pointer hint that references a skiplist element of the RCU-protected skiplist by determining whether an update operation has been performed on the RCU-protected skiplist since the pointer hint was cached by a previous invocation of the skiplist iterator operation, the pointer hint being validated if the update operation was not performed and being not validated if the update operation was performed, the skiplist element referenced by the pointer hint having an associated first key;
   if the pointer hint is validated, using the pointer hint to access the skiplist element, and dereferencing a pointer in the skiplist element to advance to a next skiplist element of the RCU-protected skiplist having an associated second key that is larger than the first key;
   if the pointer hint is not validated, performing a value-based skiplist iterator operation that includes traversing the RCU-protected skiplist using the first key to find the next skiplist element having the second key, the value-based skiplist iterator operation starting at a highest level of the skiplist, and moving down the skiplist levels toward the lowest skiplist level as necessary until the next skiplist element having the second key is reached;
   caching a new pointer hint that references the next skiplist element for use in a next invocation of the skiplist iterator operation; and
   exiting the RCU read-side critical section.

2. The method of claim 1, wherein validating the cached pointer hint includes determining whether an intervening skiplist deletion has occurred since the previous invocation of the skiplist iterator operation, and if so, invalidating the pointer hint.

3. The method of claim 2, wherein determining whether an intervening skiplist deletion has occurred includes comparing a current value of a sequence counter used for denoting skiplist element deletions against a previously-cached snapshot of the sequence counter.

4. The method of claim 3, wherein the sequence counter snapshot and the pointer hint are cached in an iterator data structure that is initialized at the beginning of a sequence of the skiplist iterator operations and regenerated whenever the value-based iterator operation is performed.

5. The method of claim 1, wherein the skiplist iterator operation accesses skiplist elements at the lowest level of the RCU-protected skiplist in which skiplist elements are linked by pointers in search key order.

6. The method of claim 1, wherein validating the cached pointer hint includes determining whether an intervening skiplist rebalancing operation has occurred since a previous invocation of the skiplist iterator operation, and if so, invalidating the pointer hint.

7. The method of claim 3, further including using the sequence counter as a count of the number of skiplist element deletions or skiplist rebalances.

8. A system, comprising:
a plurality of CPUs;
a memory coupled to the CPUs, said memory including a computer readable storage medium tangibly embodying at least one program of instructions executable by the CPUs to perform optimized skiplist iterator operations for read-copy update (RCU)-protected skiplists, the operations comprising:
entering an RCU read-side critical section;
accessing an RCU-protected skiplist having more than one level of pointers between skiplist elements, including a lowest level in which all of the skiplist elements are linked in succession in search key order, and one or more higher levels in which some of the skiplist elements are skipped;
performing a skiplist iterator operation that includes attempting to validate a cached pointer hint that references a skiplist element of the RCU-protected skiplist by determining whether an update operation has been performed on the RCU-protected skiplist since the pointer hint was cached by a previous invocation of the skiplist iterator operation, the pointer hint being validated if the update operation was not performed and being not validated if the update operation was performed, the skiplist element referenced by the pointer hint having an associated first key;
if the pointer hint is validated, using the pointer hint to access the skiplist element, and dereferencing a pointer in the skiplist element to advance to a next skiplist element of the RCU-protected skiplist having an associated second key that is larger than the first key;
if the pointer hint is not validated, performing a value-based skiplist iterator operation that includes traversing the RCU-protected skiplist using the first key to find the next skiplist element having the second key, the value-based skiplist iterator operation starting at a highest level of the skiplist, and moving down the skiplist levels toward the lowest skiplist level as necessary until the next skiplist element having the second key is reached;
caching a new pointer hint that references the next skiplist element for use in a next invocation of the skiplist iterator operation; and
exiting the RCU read-side critical section.

9. The system of claim 8, wherein validating the cached pointer hint includes determining whether an intervening skiplist deletion has occurred since the previous invocation of the skiplist iterator operation, and if so, invalidating the pointer hint.

10. The system of claim 9, wherein determining whether an intervening skiplist deletion has occurred includes comparing a current value of a sequence counter used for denoting skiplist element deletions against a previously-cached snapshot of the sequence counter.

11. The system of claim 10, wherein the sequence counter snapshot and the pointer hint are cached in an iterator data structure that is initialized at the beginning of a sequence of the skiplist iterator operations and regenerated whenever the value-based iterator operation is performed.

12. The system of claim 8, wherein the skiplist iterator operation accesses skiplist elements at the lowest level of the RCU-protected skiplist in which skiplist elements are linked by pointers in search key order.

13. The system of claim 8, wherein validating the cached pointer hint includes determining whether an intervening skiplist rebalancing operation has occurred since a previous invocation of the skiplist iterator operation, and if so, invalidating the pointer hint.

14. The system of claim 10, further including using the sequence counter as a count of the number of skiplist element deletions or skiplist rebalances.

15. A computer program product, comprising:
one or more computer readable data storage media;
program instructions stored on the one or more computer readable data storage media for programming a data processing platform having a plurality of CPUs to perform optimized skiplist iterator operations for read-copy update (RCU)-protected skiplists, the operations comprising:
entering an RCU read-side critical section;
accessing an RCU-protected skiplist having more than one level of pointers between skiplist elements, including a lowest level in which all of the skiplist elements are linked in succession in search key order, and one or more higher levels in which some of the skiplist elements are skipped;
performing a skiplist iterator operation that includes attempting to validate a cached pointer hint that references a skiplist element of an RCU-protected skiplist by determining whether an update operation has been performed on the RCU-protected skiplist since the pointer hint was cached by a previous invocation of the skiplist iterator operation, the pointer hint being validated if the update operation was not performed and being not validated if the update operation was performed, the skiplist element referenced by the pointer hint having an associated first key;
if the pointer hint is validated, using the pointer hint to access the skiplist element, and dereferencing a pointer in the skiplist element to advance to a next skiplist element of the RCU-protected skiplist having an associated second key that is larger than the first key;
if the pointer hint is not validated, performing a value-based skiplist iterator operation that includes traversing the RCU-protected skiplist using the first key to find the next skiplist element having the second key, the value-based skiplist iterator operation starting at a highest level of the skiplist, and moving down the skiplist levels toward the lowest skiplist level as necessary until the next skiplist element having the second key is reached;

caching a new pointer hint that references the next skiplist element for use in a next invocation of the skiplist iterator operation; and exiting the RCU read-side critical section.

16. The computer program product of claim 15, wherein validating the cached pointer hint includes determining whether an intervening skiplist deletion has occurred since the previous invocation of the skiplist iterator operation, and if so, invalidating the pointer hint.

17. The computer program product of claim 16, wherein determining whether an intervening skiplist deletion has occurred includes comparing a current value of a sequence counter used for denoting skiplist element deletions against a previously-cached snapshot of the sequence counter.

18. The computer program product of claim 17, wherein the sequence counter snapshot and the pointer hint are cached in an iterator data structure that is initialized at the beginning of a sequence of the skiplist iterator operations and regenerated whenever the value-based iterator operation is performed.

19. The computer program product of claim 15, wherein validating the cached pointer hint includes determining whether an intervening skiplist rebalancing operation has occurred since a previous invocation of the skiplist iterator operation, and if so, invalidating the pointer hint.

20. The computer program product of claim 17, further including using the sequence counter as a count of the number of skiplist element deletions or skiplist rebalances.

* * * * *